United States Patent
Bell et al.

[19]

[11] Patent Number: 5,902,797
[45] Date of Patent: May 11, 1999

[54] NUTRITIONAL SUPPLEMENT FOR USE IN THE TREATMENT OF ATTENTION DEFICIT

[75] Inventors: Stacey J. Bell, Belmont; R. Armour Forse, Brookline; Bruce R. Bistrian, Ipswich; Robert C. Jones, Belmont, all of Mass.

[73] Assignees: Beth Israel Deaconess Medical Center, Boston; Medical Foods, Inc., Cambridge, both of Mass.

[21] Appl. No.: 08/966,829

[22] Filed: Nov. 10, 1997

[51] Int. Cl.$^6$ .............................. A23L 1/30; A61K 47/00
[52] U.S. Cl. .................... 514/54; 514/2; 514/23; 514/53; 514/54; 514/57; 514/58; 514/59; 514/60; 514/61; 514/922; 514/948; 514/964; 426/72; 426/590; 426/601; 426/648; 426/656; 426/658; 426/660; 426/661; 426/801; 426/808; 424/439; 424/440; 424/441
[58] Field of Search ................ 514/2, 23, 53, 514/54, 57, 58, 59, 60, 61, 922, 948, 964; 426/801, 72, 590, 601, 808, 648, 656, 658, 660, 661; 424/439, 440, 441

[56] References Cited

U.S. PATENT DOCUMENTS

| | | | |
|---|---|---|---|
| 4,871,768 | 10/1989 | Bistrian et al. | 514/547 |
| 4,906,664 | 3/1990 | Bistrian et al. | 514/552 |
| 5,420,107 | 5/1995 | Brooks | 514/2 |
| 5,549,905 | 8/1996 | Mark et al. | 424/439 |
| 5,605,893 | 2/1997 | Kaufman | 514/60 |
| 5,614,531 | 3/1997 | Liebrecht et al. | 426/583 |
| 5,658,590 | 8/1997 | Heiligenstein et al. | 424/464 |

FOREIGN PATENT DOCUMENTS

0421309A2  10/1991  European Pat. Off. .

OTHER PUBLICATIONS

Klein, R.G. and Mannuzza, S., "Hyperactive Boys Almost Grown Up," *Arch Gen Psychiatry* 45:1131–1134 (1988).
Schertz, M. et al., "Predictors of Weight Loss in Children with Attention Deficit Hyperactivity Disorder Treated with Stimulant Medication," *Pediatrics* 98(4):763–769 (1996).
Spencer, T.J. et al., "Growth Deficits in ADHD Children Revisited: Evidence for Disorder–Associated Growth Delays?," *J. Am. Acad. Child Adolesc. Psychiatry* 35(11):1460–1469 (1966).

*Primary Examiner*—Frederick Krass
*Attorney, Agent, or Firm*—Hamilton,Brook,Smith & Reynolds, P.C.

[57] ABSTRACT

A nutritional supplement comprising approximately from about 5 to about 25 grams carbohydrate; approximately from about 1 to about 25 grams protein; and approximately from about 1 to about 10 grams fat, for use in treating low appetite that may result in weight loss, is described.

33 Claims, No Drawings

5,902,797

NUTRITIONAL SUPPLEMENT FOR USE IN THE TREATMENT OF ATTENTION DEFICIT

BACKGROUND OF THE INVENTION

Attention deficit disorder (ADD) and attention deficit hyperactivity disorder (ADHD) are developmental disabilities that affect 3% to 5% of school-aged children (Schertz, M. et al., *Pediatrics* 98(4):763 (1996)). The 1987 Diagnostic and Statistical Manual of Mental Disorders (DSM-III) uses ADHD to describe children who have developmentally inappropriate degrees of inattention, compulsiveness and hyperactivity.

Fourteen criteria are used to diagnose children, including: fidgeting, difficulty remaining seated, being easily distracted, blurting out answers, difficulty sustaining attention in tasks or play, shifting from one activity to another, inability to play quietly, talking excessively, interrupting others, not listening, losing things, and engaging in physically dangerous activities. Children must exhibit a minimum of eight criteria for six months for a diagnosis (Krummel, et al., Critical Reviews in *Food Science and Nutrition* 36:31–47, 1996).

The most common treatment for ADD and ADHD is psychostimulant medication, using methylphenidate hydrochloride (RITALIN™), dextroamphetamine sulfate, or magnesium pemoline. RITALIN™ is most frequently used, and is usually administered twice a day when a child is attending school. One of the most frequent side effects of psychostimulant medication is a decrease in appetite, resulting in weight loss, but to varying degrees and for a limited time in some subjects (Schertz,, M. et al., *Pediatrics* 98 (4):763 (1996)). Growth suppression as assessed by height has also been reported, but appears to become corrected by late adolescence (Spencer, T. J. et al., *J. Am. Acad. Child Adolesc. Psychiatry* 33:1460 (1996); see also Klein, R. G. and S. Mannuzza, *Arch. Gen. Psychiatry* 45:1131 (1988).

SUMMARY OF THE INVENTION

The invention pertains to a nutritional supplement which provides optimal nutrition for growth and weight maintenance, and to methods of treating weight loss associated with appetite suppression by administering the nutritional supplement. The nutritional supplement contains approximately from about 5 to about 25 grams carbohydrate; approximately from about 1 to about 25 grams protein; and approximately from about 1 to about 10 grams fat. In a preferred embodiment of the invention, the nutritional supplement contains from about 20% to about 30% of calories derived from protein; from about 30% to about 50% of calories derived from carbohydrate; and from about 30% to about 50% of calories derived from fat. The percentages are selected so as to add to 100%. The carbohydrate can include one or more sources of carbohydrate, such as corn syrup, high fructose corn syrup, corn starch, maltodextrin, fructose, lactose, glucose, sucrose, dextrose, maltose and combinations thereof. The protein can include one or more sources of protein, such as whey protein, whey protein concentrate, whey powder, egg protein, soy protein, soy protein isolate, caseinate and combinations thereof. The fat can include one or more sources of fat, including dairy fat, coconut oil, fish oil and/or vegetable oil. Structured triglycerides, long-chain triglycerides and medium-chain triglycerides can also be used as the fat.

The nutritional supplement can be provided in a variety of forms, such as nutritional beverages, baked goods, puddings, confections, snack foods, ice cream, frozen confections and novelties, or non-baked, extruded foods such as bars. The nutritional supplement, as described herein, is designed to be particularly palatable to children, in order to encourage consumption of the nutritional supplement. Ingestion of the nutritional supplement of the invention aids in maintenance of weight and/or prevention of weight loss in the individual, despite suppression of appetite, such as that associated with psychostimulant medication used by the individual.

DETAILED DESCRIPTION OF THE INVENTION

The invention is drawn to a dietary supplement that provides nutritional support (herein referred to as a "nutritional supplement") for children with attention deficit disorder (ADD) or attention deficit hyperactivity disorder (ADHD), particularly for those who are affected by appetite suppression because they are undergoing treatment with psychostimulant medication that has anorectic side effects. The invention is further drawn to facilitating intake of nutrients despite suppressed appetite, and to treating weight loss such as that which is associated with psychostimulant medication, by administering the nutritional supplement. The nutritional supplement can be made in a variety of forms, such as nutritional beverages, baked goods (e.g., cookies, brownies, fudge, cake, breads, biscuits, crackers), puddings, confections (i.e., candy), snack foods (e.g., pretzels, chips), ice cream, frozen confections and novelties, or non-baked, extruded food products such as bars.

The nutritional supplement includes the following components: carbohydrate, from about 5 to about 25 grams; protein, from about 1 to about 25 grams; and fat, from about 1 to about 10 grams.

In a preferred embodiment, the nutritional supplement comprises from about 7 to about 17 g carbohydrate; from about 1 to about 11 g protein; and from about 3.0 to about 7.5 g fat. In another preferred embodiment, a single serving includes fat in an amount such that the calories derived from fat are greater than about 30% of the total calories of the serving unit. For example, in a preferred embodiment, the percentages of calories in the serving unit are derived from the following sources: protein, from about 20% to about 30%; carbohydrate, from about 30% to about 50%; and fat, from about 30% to about 50%. For purposes of this invention, a preferred nutritional supplement comprises the components described above as a single serving (serving unit), whereby one or a plurality of these supplement(s) is consumed daily. Alternatively, the serving unit can represent the total daily allowance of the components that comprise the nutritional supplement, for example as having the percentages defined above.

It should be understood that the term "carbohydrate" generally includes simple carbohydrates (i.e., monosaccharides and disaccharides) and complex carbohydrates (i.e., polysaccharides). Sources of carbohydrate can include corn syrup, high fructose corn syrup, corn starch, uncooked corn starch, high amylose starch (e.g., such as those derived from but not limited to peas, barley, corn, potato, wheat, rice, tapioca, cassava, arrowroot, sage and oat), maltodextrin, fructose, lactose, sucrose, glucose, dextrose, syrups (e.g., maltitol), maltose and combinations of these. In a preferred embodiment, the nutritional supplement contains a variety of carbohydrate sources, each source selected from a different glycemic index (see Modern Nutrition in Health and Disease, eighth edition, Lea & Febiger, publishers, 1986, especially Volume 2, page 1270 and Appendix page A-135), so that glucose is released sequentially into the blood as the nutritional supplement is digested and absorbed. In a preferred embodiment, a nutritional supplement would contain a carbohydrate having a low glycemic index (e.g., from less than about 70), a intermediate glycemic index (e.g., from about 70 to about 80), a high glycemic index (e.g., from greater than about 90) and combinations of these. Ibid. For example, the nutritional supplement can contain sucrose, which appears in the blood first; high fructose corn syrup, such as high fructose corn syrup comprising about 42% fructose and about 43% glucose, which appears next; corn syrup, which comprises glucose polymers and appears next; and uncooked corn starch, which is slowest to release into the blood and lasts up to 8 hours in the blood (i.e., having the lowest glycemic index). See Kaufman et al., U.S. Pat. No. 5,605,893 and U.S. Ser. No. 08/631,584, now abandoned. Sucrose is the preferred simple carbohydrate (i.e., high glycemic index) because it provides the most desirable organoleptic properties compared to other sweeteners. Uncooked cornstarch is a preferred complex carbohydrate having a low glycemic index but should be included in food/beverage formulations which are not cooked or heat processed since the heat will break down the complex carbohydrate into simple carbohydrate (single glucose constituents), creating a high glycemic index product.

Staggering the release of sugars into the body prevents too much of an exacerbation of catecholamine excretion occurring immediately after ingestion of the nutritional supplement. A sudden burst of catecholamine may accelerate the individual's activity level to such an extent that it could counter-balance drug therapy which is designed to damper activity. In addition, using carbohydrates that are bound to other glucose molecules in high glycemic index foods (i.e., using polysaccharides instead of solely mono- or di-saccharides), it is possible to avoid raising insulin levels too quickly or too high which would in turn decrease free fatty acids, which increase serum tryptophan which, in turn, fosters an increase in the level of the brain neurotransmitter serotonin. This is particularly undesirable because an increase in the brain serotonin level decreases appetite. This would exacerbate suppression of appetite by the drug.

Sources of protein can be any suitable protein utilized in nutritional formulations and can include whey protein, whey protein concentrate, whey powder, egg, soy protein, soy protein isolate, caseinate (e.g., sodium caseinate, sodium calcium caseinate, calcium caseinate, potassium caseinate), animal and vegetable protein and mixtures thereof. When choosing a protein source, the biological value of the protein should be considered first, with the highest biological values being found in caseinate, whey, lactalbumen, egg albumen and whole egg proteins. In a preferred embodiment, the protein is a combination of whey protein concentrate and calcium caseinate, because these proteins have high biological value, that is, they have a high amount of the essential amino acid that is in least concentration relative to the needs of the individual. See Modern Nutrition in Health and Disease, eighth edition, Lea & Febiger, publishers, 1986, especially Volume 1, pages 30–32.

Fats and oils include but are not limited to dairy fat (e.g., butter); vegetable oil, such as canola oil, corn oil, soybean oil, sesame seed oil, safflower oil, sunflower oil, evening primrose oil, peanut oil, cottonseed oil, high oleic sunflower oil, rapeseed oil, olive oil, fish oil (e.g., menhaden oil, sardine oil) and mixtures thereof, all of which are examples of long-chain triglycerides; coconut oil, macadamia oil, palm oil, palm kernel oil, or mixtures thereof, all of which are examples of medium chain-triglycerides. Medium-chain triglycerides are rapidly taken up and used by the body (see, e.g., U.S. Pat. No. 4,871,768 of Bistrian et al. for examples of suitable fat sources). The oils can be used in their natural states; alternatively, structured triglycerides, which can be either randomly re-esterified or specifically re-esterified, can be generated from two or more oils and used as a fat source. Structured triglycerides can contain long-chain triglycerides; medium-chain triglycerides; or both long-chain and medium-chain triglycerides. In a preferred embodiment, the source of fat is canola oil.

Fats are the most calorically dense nutrient; however, fat calories, and particularly longer chain fats or more saturated fats, are typically the poorest absorbed, compared to protein and carbohydrate calories (Modern Nutrition in Health and Disease, eighth edition, Lea & Febiger, publishers, 1986, especially Volume 1, pages 82–83). In order for weight gain to occur, calories need to be absorbed. Thus, in one embodiment, the fat includes structured triglycerides, which have been shown to be well absorbed in critically ill patients who have difficulty absorbing fats (Kenler, A. S. et al., *Annals of Surg.* 223 (3):316–333 (1996); Christensen et al., *Am. J. Clin. Nutr.* 61:56–61 (1995)). In children having normal gastrointestinal tracts, the structured triglycerides should be nearly completely absorbed.

Preferably, the nutritional supplement provides approximately 100 kcal per unit serving, because it is designed to supplement regular meals, rather than to replace them. The objective of the invention is to supplement the diet of an individual, and not to depress the individual's appetite at meals themselves; the 100 kcal size is optimal to meet this objective. Further, a nutritional bar that provides 100 kcal per serving makes it easy for the individual to track calories. However, other unit serving sizes are embraced by the invention.

The nutritional supplement can also contain other ingredients such as one or a combination of vitamins, minerals, antioxidants, fiber and other dietary supplements. Selection of one or several of these ingredients is a matter of formulation design, consumer preference and end-user. The amount of these ingredients added to the nutritional supplements of this invention are readily known to the skilled artisan and guidance to such amounts can be provided by the U.S. RDA doses for children and adults. Vitamins and minerals that can be added include, but are not limited to, calcium phosphate or acetate, tribasic; potassium phosphate, dibasic; magnesium sulfate or oxide; salt (sodium chloride); potassium chloride or acetate; ascorbic acid; ferric orthophosphate; alpha-tocopheryl acetate; niacinamide; zinc sulfate or oxide; calcium pantothenate; copper gluconate; riboflavin; beta-carotene; pyridoxine hydrochloride; thiamin mononitrate; folic acid; biotin; chromium chloride or picolonate; potassium iodide; sodium selenate; sodium molybdate; phylloquinone; Vitamin $D_3$; cyanocobalamin; sodium selenite; copper sulfate; Vitamin A; Vitamin $B_6$ and hydrochloride thereof; Vitamin E; Vitamin E acetate; Vitamin C; inositol; Vitamin $B_{12}$; potassium iodide.

Flavors, coloring agents, spices, nuts and the like can be incorporated into the product. Flavorings can be in the form of flavored extracts, volatile oils, chocolate flavorings, peanut butter flavoring, cookie crumbs, vanilla or any commercially available flavoring. Examples of useful flavorings include but are not limited to pure anise extract, imitation banana extract, imitation cherry extract, chocolate extract, pure lemon extract, pure orange extract, pure peppermint extract, imitation pineapple extract, imitation rum extract, imitation strawberry extract, or pure vanilla extract; or volatile oils, such as balm oil, bay oil, bergamot oil, cedarwood oil, cherry oil, cinnamon oil, clove oil, or peppermint oil; peanut butter, chocolate flavoring, vanilla cookie crumb, butterscotch or toffee. In a preferred embodiment, the nutritional supplement contains cocoa or chocolate, because of the appeal of such ingredients to children.

Emulsifiers may be added for stability of the final product. Examples of suitable emulsifiers include, but are not limited to, lecithin (e.g., from egg or soy), and/or mono- and di-glycerides. Other emulsifiers are readily apparent to the skilled artisan and selection of suitable emulsifier(s) will depend, in part, upon the formulation and final product.

Preservatives may also be added to the nutritional supplement to extend product shelf life. Preferably, preservatives such as potassium sorbate, sodium sorbate, potassium benzoate, sodium benzoate or calcium disodium EDTA are used.

In addition to the carbohydrates described above, the nutritional supplement can contain artificial sweeteners, e.g., saccharides, cyclamates, aspartamine, aspartame, acesulfame K and/or sorbitol. Such artificial sweeteners can be desirable if the nutritional supplement is intended for an overweight or obese individual, or an individual with type II diabetes who is prone to hyperglycemia.

In one embodiment, the nutritional supplement is a nonbaked, extruded food bar that provides 100 kcal/unit serving and has the following characteristics:

approximately 3.25 g fat: canola oil approximately 6.8 g protein: whey protein concentrate (3.20 g); calcium caseinate (2.575 g);

whey protein isolate (1.0250 g)

approximately 10.4 g carbohydrate: corn syrup (2.625 g) (42% fructose and 43% glucose, DE (dextrose equivalent)=42; available from ADM corn processing, Decatur, Illinois, as corn syrup 42/43), high fructose corn syrup (2.5 g), uncooked corn starch (2.0638 g), sucrose (2.0613 g), fructose (1.1250 g).

In this preferred embodiment, the percent of calories from each source is as follows: protein, approximately 27%; carbohydrate, approximately 42%, and fat, approximately 30%. In a preferred embodiment, such a food bar comprises the following ingredients: canola oil (3.25 g), whey protein concentrate (3.20 g), corn syrup (2.625 g), calcium caseinate (2.575 g), high fructose corn syrup (2.5 g), cocoa (processed with alkali) (2.150 g), uncooked cornstarch (2.0638 g), sucrose (2.0613 g), fructose (1.1250 g), whey protein isolate (1.0250 g), water (1.0 g), polydextrose (0.7250 g), natural and artificial flavors (0.4250 g), lecithin (0.250 g) and acesulfame K (0.0250 g).

To manufacture such a food bar, the liquid ingredients are cooked; the dry ingredients are added with the liquid ingredients in a mixer and mixed until the dough phase is reached; the dough is put into an extruder, and extruded; the extruded dough is cut into appropriate lengths; and the product is cooled.

For manufacture of other foods or beverages, the ingredients comprising the nutritional supplement of this invention can be added to traditional formulations or they can be used to replace traditional ingredients, particularly the carbohydrate components. Those skilled in food formulating will be able to design appropriate foods/beverages with the objective of this invention in mind.

The nutritional supplement can be consumed at any time of day, as part of a meal supplementation program. For example, if a patient takes one dose of appetite-suppressing medication with breakfast, the nutritional supplement can be consumed as a snack at a time when appetite will be suppressed, such as at midmorning. The nutritional supplement can be consumed as long as necessary to ensure appropriate nutrition for growth, (e.g., as long as an individual is affected by appetite suppression).

Although, the nutritional supplement has been described herein in the context of attention deficit disorder and attention deficit hyperactivity disorder, it can be used for other individuals to provide optimal nutrition for growth and/or weight maintenance, particularly for those who are affected by appetite suppression, such as individuals undergoing treatment with medication, including psychostimulant medication, that has appetite-suppressant and/or anorectic side effects. The supplement can also be used by individuals who are affected by a disease or condition that prevents intake of adequate nutrition or who require increased calories and/or protein. For example, individuals having infections, AIDS, cancer, pressure ulcers, disorders such as anorexia, or malnutrition, would benefit from the use of the nutritional supplements defined herein, as would post-surgical patients. The products of this invention can also be consumed by healthy children to provide optimal nutrition for growth, and by adults for weight maintenance to provide optimal nutrition. The supplement further provides a nutritious alternative to snacks that are a source of empty calories for use between or with meals.

EQUIVALENTS

Those skilled in the art will recognize, or be able to ascertain, using no more than routine experimentation many equivalents to the specific embodiments of the invention described herein. Such equivalents are intended to be encompassed by the following claims:

What is claimed is:

1. A nutritional supplement comprising approximately from about 5 to about 25 grams carbohydrate; approximately from about 1 to about 25 grams protein; and approximately from about 1 to about 10 grams fat, wherein from about 30% to about 50% of calories in the nutritional supplement are derived from carbohydrate; from about 20% to about 30% of calories in the nutritional supplement are derived from protein; and from about 30% to about 50% of calories in the nutritional supplement are derived from fat, the composition of said supplement being selected so that glucose will be released sequentially into the blood as the nutritional supplement is digested and absorbed.

2. The nutritional supplement of claim 1 wherein the supplement comprises from about 7 to about 17 grams carbohydrate.

3. The nutritional supplement of claim 1 wherein the supplement comprises from about 1 to about 11 grams protein.

4. The nutritional supplement of claim 1 wherein the supplement comprises from about 3.0 to about 7.5 grams fat.

5. The nutritional supplement of claim 1, wherein the carbohydrate comprises a carbohydrate having a high glycemic index; a carbohydrate having an intermediate glycemic index; and a carbohydrate having a low glycemic index.

6. The nutritional supplement of claim 1, wherein the carbohydrate comprises at least one carbohydrate source selected from the group consisting of: corn syrup, high fructose corn syrup, corn starch, uncooked corn starch, high amylose starch, maltodextrin, sucrose, fructose, lactose, glucose, dextrose, maltose and combinations thereof.

7. The nutritional supplement of claim 1, wherein the carbohydrate comprises more than one carbohydrate source, each carbohydrate source being selected from the group consisting of: corn syrup, high fructose corn syrup, corn starch, uncooked corn starch, high amylose starch, maltodextrin, fructose, sucrose, lactose, glucose, dextrose, maltose and combinations thereof.

8. The nutritional supplement of claim 7, wherein the carbohydrate comprises sucrose, high fructose corn syrup, corn syrup, fructose and uncooked corn starch.

9. The nutritional supplement of claim 1, wherein the protein comprises at least one protein source selected from the group consisting of: whey protein, whey protein concentrate, whey powder, egg protein, soy protein, soy protein isolate, sodium caseinate, sodium calcium caseinate, calcium caseinate, potassium caseinate and combinations thereof.

10. The nutritional supplement of claim 1, wherein the protein comprises more than one protein source, each protein source being selected from the group consisting of: whey protein, whey protein concentrate, whey powder, egg protein, soy protein, soy protein isolate, sodium caseinate, sodium calcium caseinate, calcium caseinate, potassium caseinate and combinations thereof.

11. The nutritional supplement of claim 10, wherein the protein source comprises whey protein concentrate and calcium caseinate.

12. The nutritional supplement of claim 1, wherein the fat comprises at least one fat selected from the group consisting of: dairy fat, structured triglycerides, long-chain triglycerides, medium-chain triglycerides, canola oil, corn oil, soybean oil, sesame seed oil, safflower oil, sunflower oil, high oleic sunflower oil, rapeseed oil, olive oil, sardine oil, menhaden oil, evening primrose oil, peanut oil, cottonseed oil, coconut oil, macadamia oil, palm oil, palm kernel oil and combinations thereof.

13. The nutritional supplement of claim 12, wherein the fat comprises canola oil.

14. The nutritional supplement of claim 1, wherein the fat comprises more than one fat, each fat being selected from the group consisting of: dairy fat, structured triglycerides, long-chain triglycerides, medium-chain triglycerides, canola oil, corn oil, soybean oil, sesame seed oil, safflower oil, sunflower oil, high oleic sunflower oil, rapeseed oil, olive oil, menhaden oil, sardine oil, evening primrose oil, peanut oil, cottonseed oil, coconut oil, macadamia oil, palm oil, palm kernel oil and combinations thereof.

15. The nutritional supplement of claim 1, wherein the form of the nutritional supplement is selected from the group consisting of: nutritional beverage, baked good, pudding, confection, snack food, ice cream, frozen confection, and non-baked, extruded food product.

16. The nutritional supplement of claim 15, wherein the baked good is selected from the group consisting of: cookie, brownie, fudge, cake, bread, biscuit, and cracker.

17. The nutritional supplement of claim 15, wherein the non-baked, extruded food product is a bar.

18. A nutritional supplement of claim 1 having a calorie content of approximately 100 kcals.

19. A nutritional supplement comprising: approximately from about 5 to about 25 grams carbohydrate, wherein the carbohydrate comprises at least one carbohydrate source selected from the group consisting of: corn syrup, high fructose corn syrup, corn starch, uncooked corn starch, high amylose starch, maltodextrin, sucrose, fructose, lactose, glucose, dextrose, maltose and combinations thereof, and wherein from about 30% to about 50% of calories in the nutritional supplement are derived from carbohydrate;

approximately from about 1 to about 25 grams protein, wherein the protein comprises at least one protein source selected from the group consisting of: whey protein, whey protein concentrate, whey powder, egg protein, soy protein, soy protein isolate, sodium caseinate, sodium calcium caseinate, calcium caseinate, potassium caseinate and combinations thereof, and wherein from about 20% to about 30% of calories in the nutritional supplement are derived from protein; and approximately from about 1 to about 10 grams fat, wherein the fat comprises at least one fat source selected from the group consisting of: dairy fat, structured triglycerides, long-chain triglycerides, medium-chain triglycerides, canola oil, corn oil, soybean oil, sesame seed oil, safflower oil, sunflower oil, high oleic sunflower oil, rapeseed oil, olive oil, menhaden oil, sardine oil, evening primrose oil, peanut oil, cottonseed oil, coconut oil, macadamia oil, palm oil, palm kernel oil and combination thereof, and wherein from about 30% to about 50% of calories in the nutritional supplement are derived from fat, the composition of said supplement being selected so that glucose will be released sequentially into the blood as the nutritional supplement is digested and absorbed.

20. The nutritional supplement of claim 19, wherein the carbohydrate comprises sucrose, high fructose corn syrup, corn syrup, fructose and uncooked corn starch; wherein the protein source comprises whey protein concentrate and calcium caseinate; and wherein the fat comprises canola oil.

21. The nutritional supplement of claim 20, which is a non-baked, extruded food product.

22. A nutritional supplement comprising approximately from about 7 to about 17 grams carbohydrate; approximately from about 1 to about 11 grams protein; and approximately from about 3.0 to about 7.5 grams fat, wherein from about 30% to about 50% of calories in the nutritional supplement are derived from carbohydrate; from about 20% to about 30% of calories in the nutritional supplement are derived from protein; and from about 30% to about 50% of calories in the nutritional supplement are derived from fat, the composition of said supplement being selected so that glucose will be released sequentially into the blood as the nutritional supplement is digested and absorbed.

23. An extruded, nonbaked food bar comprising from about 5 to about 25 grams carbohydrate; approximately from about 1 to about 25 grams protein; and approximately from about 1 to 10 grams fat, wherein from about 30% to about 50% of calories in the nutritional supplement are derived from carbohydrate; from about 20% to about 30% of calories in the nutritional supplement are derived from protein, and from about 30% to about 50% of calories in the nutritional supplement are derived from fat, the composition of said bar being selected so that glucose will be released sequentially into the blood as the bar is digested and absorbed.

24. The food bar of claim 23, wherein the carbohydrate comprises an amount of about 7 to about 17 grams; the protein comprises an amount of about 1 to about 11 grams; and the fat comprises an amount of about 3.0 to about 7.5 grams.

25. The food bar of claim 23 having a calorie content of approximately 100 calories.

26. The food bar of claim 23 comprising sucrose, corn syrup, corn starch, fructose, canola oil, whey protein concentrate, caseinate, flavor and emulsifier.

27. A method of providing nutritional supplementation to an individual in need thereof, comprising administering to the individual a nutritional supplement comprising approximately from about 5 to about 25 grams carbohydrate; approximately from about 1 to about 25 grams protein; and approximately from about 1 to about 10 grams fat, wherein from about 30% to about 50% of calories in the nutritional supplement are derived from carbohydrate; from about 20% to about 30% of calories in the nutritional supplement are derived from protein; and from about 30% to about 50% of calories in the nutritional supplement are derived from fat, the composition of said supplement being selected so that glucose will be released sequentially into the blood as the nutritional supplement is digested and absorbed.

28. The method of claim 27 wherein the individual has a suppressed appetite.

29. The method of claim 28, wherein the nutritional supplement is a nonbaked, extruded food product comprising:

approximately from about 5 to about 25 grams carbohydrate, wherein the carbohydrate comprises at least one carbohydrate source selected from the group consisting of: corn syrup, high fructose corn syrup, corn starch, uncooked corn starch, high amylose starch, maltodextrin, fructose, lactose, sucrose, glucose, dextrose, maltose and combination thereof;

approximately from about 1 to about 25 grams protein, wherein the protein comprises at least one protein source selected from the group consisting of: whey protein concentrate, whey powder, egg protein, soy protein, soy protein isolate, sodium caseinate, sodium calcium caseinate, calcium caseinate, potassium caseinate and combination thereof; and approximately 1–10 grams fat, wherein the fat comprises at least one fat source selected from the group consisting of: dairy fat, structured triglycerides, long-chain triglycerides, medium-chain triglycerides, canola oil, corn oil, soybean oil, sesame seed oil, safflower oil, sunflower oil, high oleic sunflower oil, rapeseed oil, olive oil, menhaden oil, sardine oil, evening primrose oil, peanut oil, cottonseed oil, coconut oil, macadamia oil, palm oil, palm kernel oil and combinations thereof.

30. The method of claim 29, wherein the carbohydrate comprises sucrose, i!high fructose corn syrup, corn syrup, fructose and uncooked corn starch; wherein the protein source comprises whey protein concentrate and calcium caseinate; and wherein the fat comprises canola oil.

31. A method of providing nutritional support to an individual undergoing drug therapy which can cause appetite suppression, comprising administering to the individual in need thereof the nutritional supplement of claim 1.

32. A method of treating weight loss associated with appetite suppression comprising administering to the individual in need thereof the nutritional supplement of claim 1.

33. The method of claim 32, wherein the individual is a child having attention deficit disorder or attention deficit hyperactivity disorder.

* * * * *